(12) United States Patent
Parker, III et al.

(10) Patent No.: US 12,049,285 B2
(45) Date of Patent: Jul. 30, 2024

(54) TRANSVERSE HYDRO-LAMINAR FLOW SYSTEM

(71) Applicant: Parker Maritime Technologies, LLC, Rhinecliff, NY (US)

(72) Inventors: William J. Parker, III, Rhinecliff, NY (US); Katherine Howell Brinson, Brooklyn, NY (US)

(73) Assignee: Parker Maritime Technologies, LLC, Saratoga, CA (US)

( * ) Notice: Subject to any disclaimer, the term of this patent is extended or adjusted under 35 U.S.C. 154(b) by 436 days.

(21) Appl. No.: 17/382,238

(22) Filed: Jul. 21, 2021

(65) Prior Publication Data

US 2023/0034377 A1   Feb. 2, 2023

(51) Int. Cl.
*B63B 1/38* (2006.01)
*A62C 3/10* (2006.01)

(52) U.S. Cl.
CPC .............. *B63B 1/38* (2013.01); *A62C 3/10* (2013.01); *B63B 2001/387* (2013.01)

(58) Field of Classification Search
CPC ............. B63B 1/38; B63B 2001/385; B63B 2001/387; A62C 3/10; Y02T 70/10
See application file for complete search history.

(56) References Cited

U.S. PATENT DOCUMENTS

| | | | |
|---|---|---|---|
| 1,894,256 | A | 1/1933 | De Ganahl et al. |
| 3,016,865 | A | 1/1962 | Eichenberger |
| 3,455,266 | A | 7/1969 | Giles |
| 4,922,844 | A | 5/1990 | Solia |
| 5,149,043 | A | 9/1992 | Grundmann |
| 5,967,071 | A | 10/1999 | Wipper |

(Continued)

FOREIGN PATENT DOCUMENTS

| | | |
|---|---|---|
| GB | 2382801 A | 6/2003 |
| WO | 2009/122100 A1 | 10/2009 |

(Continued)

OTHER PUBLICATIONS

International Search Report and Written Opinion mailed Oct. 13, 2022, directed to International Application No. PCT/US2022/073942; 8 pages.

(Continued)

*Primary Examiner* — Andrew Polay
(74) *Attorney, Agent, or Firm* — Morrison & Foerster LLP (57) ABSTRACT

A transverse hydro-laminar flow system is a system that improves laminar flow across a watercraft's hull as the watercraft is moving through a body of water. The system may include air dispersal units, a first base anchor, a second base anchor, an air supply system, a controller, and a power system. The air dispersal units enable the creation of an air layer between the watercraft's hull and the surrounding water. The first base anchor and the second base anchor facilitate the fastening of the air dispersal units about the watercraft's hull without the need to dry dock the watercraft. The air supply system provides a constant air flow to each of the air dispersal units to enable the creation of the air layer that reaches most of the watercraft's hull. The controller enables the configuration of the system, while the power system supplies the necessary power for the system operation.

13 Claims, 10 Drawing Sheets

(56) References Cited

U.S. PATENT DOCUMENTS

| | | |
|---|---|---|
| 6,356,816 B1 | 3/2002 | Katz |
| 6,883,450 B2 | 4/2005 | Kingsbury |
| D576,721 S | 9/2008 | Nishio et al. |
| D576,722 S | 9/2008 | Nishio et al. |
| D586,454 S | 2/2009 | Nishio et al. |
| 7,997,221 B2 | 8/2011 | Costas |
| 8,196,536 B1 | 6/2012 | Harbin |
| 8,931,752 B2 | 1/2015 | Roberts |
| D767,111 S | 9/2016 | Glick, Jr. |
| D770,028 S | 10/2016 | Glick, Jr. |
| 10,730,588 B2 | 8/2020 | Yousef |
| 2008/0083361 A1 | 4/2008 | Iglesias Schoo |
| 2009/0233502 A1 | 9/2009 | Wellman |
| 2009/0260561 A1 | 10/2009 | Takahashi |
| 2016/0075406 A1 | 3/2016 | Johannesson |
| 2016/0185423 A1 | 6/2016 | Takano |
| 2018/0229808 A1 | 8/2018 | Wang |
| 2022/0219787 A1 | 7/2022 | Parker, III et al. |
| 2023/0147120 A1* | 5/2023 | Kapteijn .................. B63B 1/38 114/67 A |

FOREIGN PATENT DOCUMENTS

| | | |
|---|---|---|
| WO | WO2010064911 A1 | 6/2010 |
| WO | 2011/119182 A2 | 9/2011 |
| WO | 2011/161187 A1 | 12/2011 |

OTHER PUBLICATIONS

International Search Report and Written Opinion mailed Mar. 25, 2022, directed to International Application No. PCT/US2022/070123; 8 pages.

Parker et al., U.S. Office Action dated Dec. 6, 2023, directed to U.S. Appl. No. 29/771,318; 10 pages.

* cited by examiner

TRANSVERSE HYDRO-LAMINAR FLOW SYSTEM

FIELD OF THE INVENTION

The present invention generally relates to a laminar flow system and watercrafts. More specifically, the present invention is a system that provides and sustains laminar flow and sound mitigation between the wetted hull of a watercraft and the surrounding water through which the watercraft traverses.

BACKGROUND OF THE INVENTION

Various watercraft systems are currently available that address the use of airflow around a small portion of the watercraft's hull to reduce the water drag on the watercraft's hull. These systems are beneficial as they minimally reduce the hydrodynamic drag resultant from the friction incurred by a small portion of the full wetted surface of the watercraft's hull as it moves through seawater/freshwater. The hydrodynamic drag reduction also results in lower Total Hull Resistance ($R_T$), thus reducing the Effective Horsepower (EHP) needed to propel the watercraft through the body of water. The reduction of EHP results in lower fuel consumption as well as reduced emissions to the environment that result from the power generation. Currently patented systems do not enable the mitigation of noise pollution entering the water as created by sound emanating from the watercraft's hull and propeller cavitation. In addition, these systems do not help reduce the rate of marine growth on the watercraft's wetted hull. Most of the current solutions are limited to the flat-bottom portion of the watercraft's hull and do not reduce sound emanating into the water. The Transverse Hydro-Laminar Flow System does improve these conditions. In addition, the current solutions require drydocking the watercraft for system installation. The Transverse Hydro-Laminar Flow System does not require drydocking for installation.

It is an object of the present invention to provide an improved system for producing, distributing, and sustaining air between the wetted hull of a vessel and the surrounding water as the vessel transits for the combined purposes of reducing Viscous Resistance ($R_V$) and providing sound insulation around the watercraft's hull. It is another object of the present invention to extend $R_V$ reduction and sound insulation to a level at or near the entirety of the wetted hull surface area to extend laminar flow beyond the hull's bottom which also enhances sound insulation attributes. Another object of the present invention is to provide a method of operating such a system in a displacement watercraft. Another object of the present invention is to provide a method for incorporating the present invention into the construction or the retrofitting of displacement watercraft of varying sizes and hull forms without a dry-docking requirement, weakening of the existing hull, or interference to any other shipboard equipment, systems, or discharges. It is another object of the present invention to provide a method for installing or retrofitting such a system aboard a vessel without interference to the watercraft's cargo space(s), cargo carrying capacity, or cargo handling. It is another object of the present invention to provide a system for producing, distributing, and sustaining an air layer between the wetted hull and the surrounding water that can be operated in an efficient and stable manner as the watercraft transits in heavy sea conditions. It is another object of the present invention to provide a system for reducing the emissions of Greenhouse Gasses, Carbon and Sulfur into the atmosphere. Additional features and benefits of the present invention are further discussed in the sections below.

SUMMARY OF THE INVENTION

The present invention is a transverse hydro-laminar flow system that reduces the $R_V$ resultant from the friction incurred by a watercraft's wetted hull as it moves through different bodies of water. The system of the present invention not only facilitates the production, distribution, and sustainment of the desired air layer between the watercraft's wetted hull and the surrounding water, but also ensures the system's structural integrity, durability, and non-interference with the watercraft operations. The present invention includes multiple air dispersal units, multiple base anchors, an air supply system, and a control system. These components form an air dispersal structure that supports air distribution across most of the watercraft's wetted hull by distributing the multiple air dispersal units around the watercraft's hull to generate an air layer designed to improve laminar flow across the wetted hull and simultaneously reduce hull noise emanating to the ocean environment by means of an air buffer. Because less fuel will be burned as a result of using this system, there will be less Greenhouse gas emissions from the watercraft.

The air dispersal structure formed by the multiple air dispersal units distributes and sustains an air layer across the watercraft's wetted hull. The length of the air dispersal unit is based upon the dimensions of the watercraft (length, beam, draft), the underwater hull configuration, and the air production/distribution needed to sustain the air layer necessary for $R_V$ reduction and sound isolation. Multiple air dispersal structures are strategically positioned across the wetted hull from a point of origin at or near the watercraft's bow to points of termination near the watercraft's stern or as far as necessary to ensure maximize air layer effectiveness across the wetted hull. As such, the air dispersal structure can range from ten feet (ft.) to 400 ft. as required and may include both perforated and non-perforated air dispersal units in support of delivering/sustaining airflow at specifically desired locations across the wetted hull. The quantity of air dispersal structures employed per watercraft will range between two to 14 based upon the watercraft's dimensions and the underwater hull configuration.

By creating an air layer between the watercraft's wetted hull and the surrounding water, the present invention can increase fuel efficiency of the watercraft (8-20%), reduce fuel demand, reduce operating costs, reduce hazardous emissions, reducing noise pollution, and reduce the rate of marine growth upon the hull. The present invention uses oil-free compressors and incorporates recycled plastics within the various components to further enhance efficiency and to protect the environment. All facets of the present invention described herein can be easily installed in new construction watercraft or retrofitted aboard in-service watercraft. The installation involves no hull access cuts and can be completed waterborne, thus eliminating the time, cost, operational impact, and risk associated with drydocking. The present invention is scalable to displacement watercraft of all sizes, hull forms, missions, and types of propulsion and is adaptable to support any unique wetted hull fixtures or access requirements. The present invention does not interfere with existing cargo capacity/handling,

DETAIL DESCRIPTIONS OF THE INVENTION

All illustrations of the drawings are for the purpose of describing selected versions of the present invention and are not intended to limit the scope of the present invention.

Figure 10:
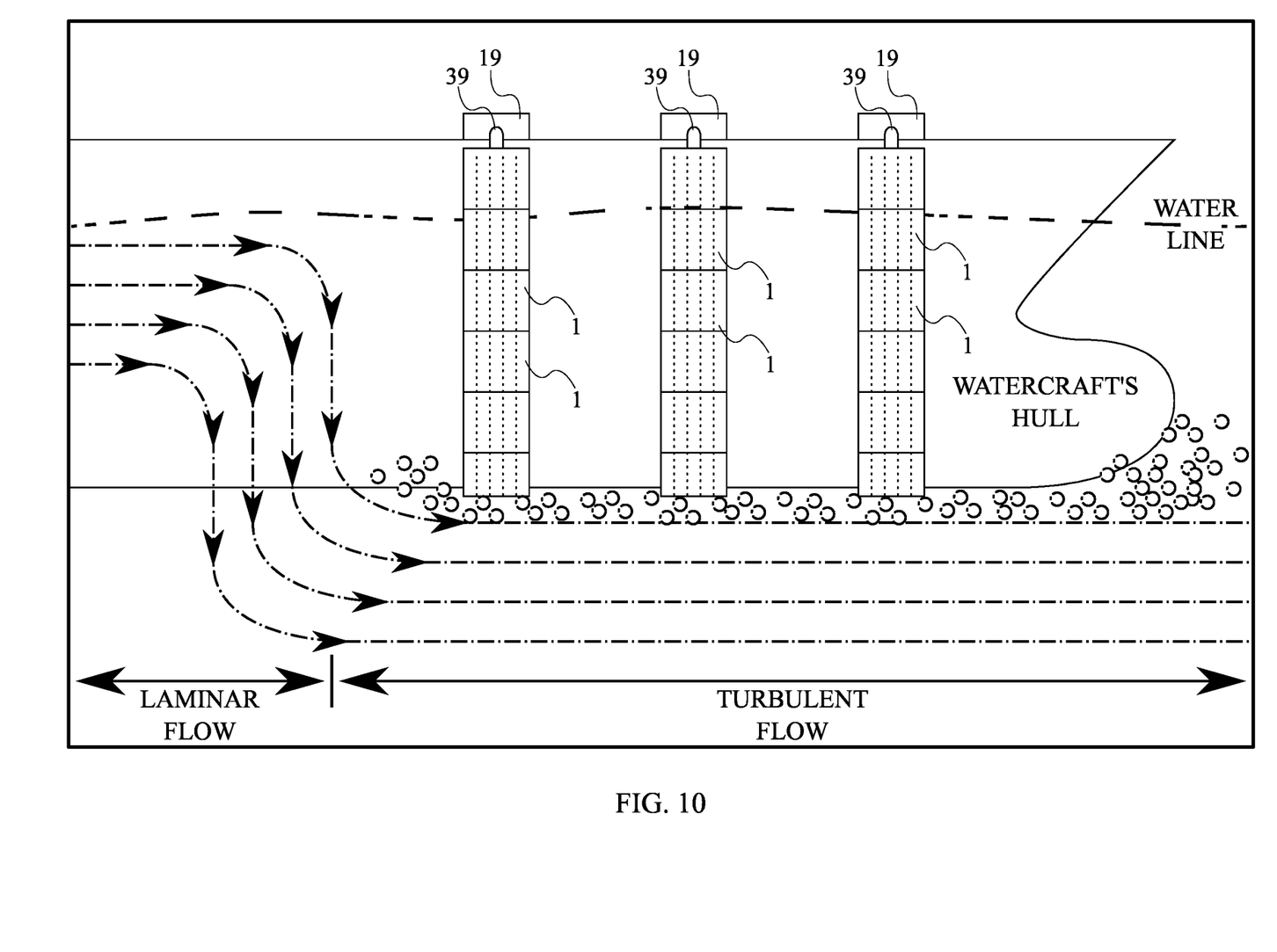
FIG. 10 is a side schematic view showing the difference between laminar flow and turbulent flow to illustrate the enhanced fuel economy resulting from increased laminar flow (and its associated efficiency) and decreased turbulent flow (and its inherent instability) across a greater a portion of the watercraft's wetted hull while transiting through the surrounding liquid environment.

The present invention is a transverse hydro-laminar flow system designed to reduce the Viscous Resistance ($R_V$) resultant from the hydrodynamic drag incurred by a watercraft's wetted hull moving through a body of water. As can be seen in FIG. 10, by reducing the $R_V$, the present invention also reduces the Total Hull Resistance (RT), thus reducing the Effective Horsepower (EHP) needed to propel the watercraft and consequently reducing the fuel consumption and the discharge of environmental emissions associated with power generation. The present invention is also designed to mitigate the noise created by sound emanating from the watercraft's hull and propeller cavitation. Further, the present invention reduces the rate of marine growth upon the watercraft's wetted hull while also supporting waterborne installation of the present invention.

To meet the objectives, the present invention leverages principles of fluid mechanics, hydrodynamics, aerodynamics, sound propagation, and laminar/turbulent fluid flow. A summary of these concepts and their applicability to the present invention is as follows:

Fluid Mechanics: The behavior of independent fluids and the forces acting upon them. The present invention discharges air flow below the watercraft's hull. The combination of rising air and watercraft movement forms an air layer across the wetted hull.

Hydrodynamics: The motion of fluids and the forces acting upon solid bodies immersed within fluids and in motion relative to them. The motion of water across a transiting watercraft's wetted hull, and the movement of the wetted hull through the surrounding water, are influenced by the $R_V$, associated with the drag between the wetted hull and the surrounding water. Via the creation of an air layer between the wetted hull and the surrounding water, the $R_V$ between the watercraft's hull and the surrounding water is decreased.

Aerodynamics: The properties of moving air and the interaction between air and solid bodies moving through it. Because the hydrodynamic drag exceeds the aerodynamic drag, the generated air layer between the watercraft's wetted hull and the surrounding water allows the wetted hull to transit through the resulting fluid bearing less resistance than an exclusive water fluid medium.

Sound Propagation: A sound wave propagating through water consists of alternating compressions and rarefactions of the water, detectable by (and potentially harmful to) marine life. As sound waves travel through air, the amplitude of the sound wave decreases (attenuates) as some of the energy carried by the wave is lost to friction and relaxation processes in the gas (air). By establishing an air buffer between a watercraft's wetted hull and the surrounding water, the present invention facilitates sound insulation by diminishing the amplitude of sound waves emanating from the hull and propeller cavitation.

Laminar Flow: Fluid flow characterized by particles following smooth paths along adjacent layers. Each layer moving smoothly past the adjacent layers with little or no mixing. By reducing the $R_V$ via the establishment of the air layer between the wetted hull of and the surrounding water, the streamlined fluid flow is enhanced across a greater portion of the wetted hull surface area, thus enhancing laminar flow.

Turbulent Flow: Fluid flow characterized by chaotic changes in pressure, variations in flow velocity, and significant mixing across layers. By reducing the $R_V$ via the establishment of the air layer between the wetted hull and the surrounding water, the stabilization of pressure and flow velocity, as well as a reduction in mixing across layers is achieved, thus reducing turbulent flow.

Furthermore, the engineering basis for the objectives and accomplishment of the present invention is as follows:

$$R_T = R_V + R_W + R_A$$

Wherein $R_T$ is the Total Hull Resistance (lbs.), $R_V$ is the Viscous (Friction) Resistance, $R_W$ is the Wave-making Resistance, and $R_A$ is the Air Resistance (Ship moving in calm air).

$$R_V = C_V \frac{1}{2} \rho V^2 S$$

Wherein $R_V$ is the Viscous Resistance, $C_V$ is the Coefficient of Viscous Resistance equal to the Skin Friction ($C_f$) plus the Pressure Drag ($K^*C_F$), which is equal to ($C_F+K^*C_F$) wherein $C_F$ is the Tangential Component of ($R_V$) and $K^*C_F$ is the Normal Component of ($R_V$), $\rho$ is the Fresh/Salt Water Density (lb-s²/ft⁴) (as applicable), V is the Velocity (ft/sec), and S is the Wetted Surface Area of Underwater Hull (ft²).

$$EHP = \frac{R_T V_S}{550 \frac{ft-lb}{sec-HP}}$$

Wherein EHP is the Effective Horsepower (EHP), $R_T$ is the Total Hull Resistance (lbs.), and $V_S$ is the Ship's Speed (ft/sec).

$$v = (K\rho)^{\left(-\frac{1}{2}\right)}$$

Wherein v is the Speed of Sound (ft/sec), K is the Compressibility of the Medium, and $\rho$ is the Density of the Medium.

As can be seen in FIGS. 1, 2, 8, and 9, the present invention may comprise a plurality of air dispersal units 1, a first base anchor 18, a second base anchor 19, an air supply system 20, a controller 29, and a power system 30. The plurality of air dispersal units 1 enables the creation of an air layer by dispersing air flow around the watercraft's hull. The first base anchor 18 and the second base anchor 19 facilitate the fastening of the plurality of air dispersal units 1 around the watercraft's hull without the need to dry dock the watercraft. The air supply system 20 provides a constant airflow to each of the plurality of air dispersal units 1 to enable the creation of the air layer that reaches most of the watercraft's hull surface area. Further, the controller 29 enables the users to configure the operation of the present invention, while the power system 30 supplies the necessary power for the operation of the present invention.

Figure 8:
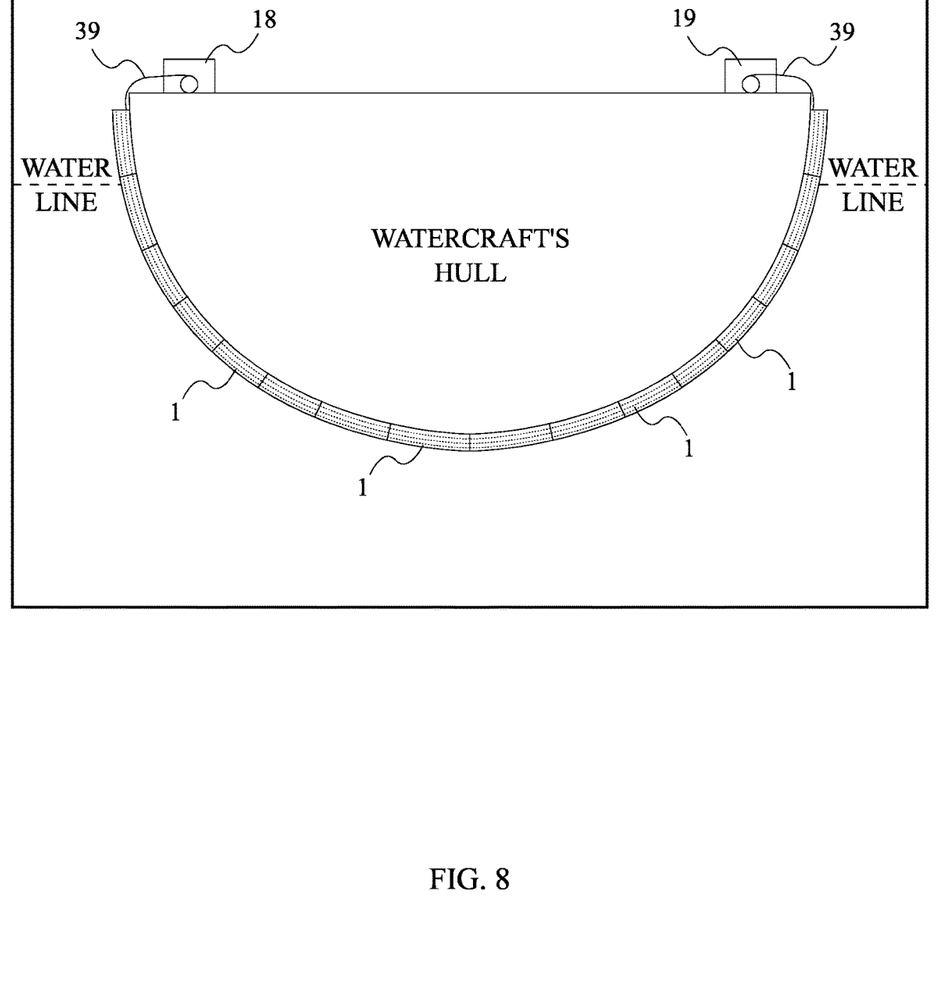
FIG. 8 is a front schematic view showing the plurality of air dispersal units mounted in between the first base anchor and the second base anchor, wherein the first base anchor and the second base anchor are shown positioned on the starboard side and the port side of the watercraft, respectively.
Figure 9:
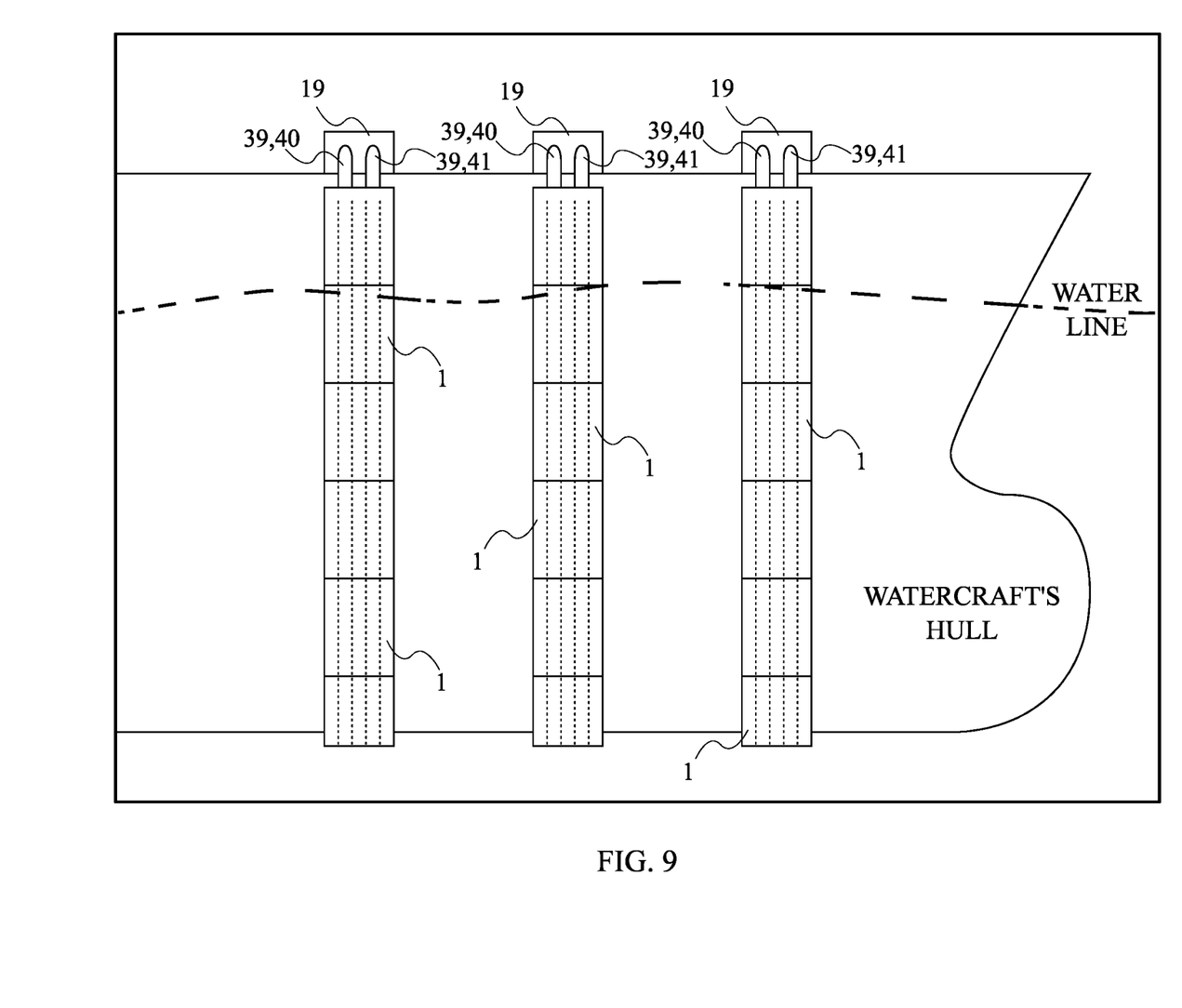
FIG. 9 is a side schematic view showing multiple of the present invention being distributed along the watercrafts' hull, wherein multiple base anchors are shown distributed along the watercraft's deck.

The general configuration of the aforementioned components facilitates the production, distribution, and sustainment of the desired air layer between the watercraft's wetted hull and the surrounding water without affecting the structural integrity, durability, and non-interference of the present invention with the watercraft's operations. As can be seen in FIG. 8 through 10, the plurality of air dispersal units 1 preferably includes multiple scalene triangular-shaped structures that are distributed about the watercraft's hull. Each air dispersal unit of the plurality of air dispersal units 1 is preferably made from casted 3/16' aluminum with side measurements ranging from two to 16 inches (in.) and a total length ranging from two to eight feet (ft.). The plurality of air dispersal units 1 is serially coupled to each other to form a chain structure that can be positioned under the watercraft's hull. Multiple air dispersal units are serially coupled to each other to form a chain structure long enough to cover a large surface area of the watercraft's wetted hull.

Figure 1:
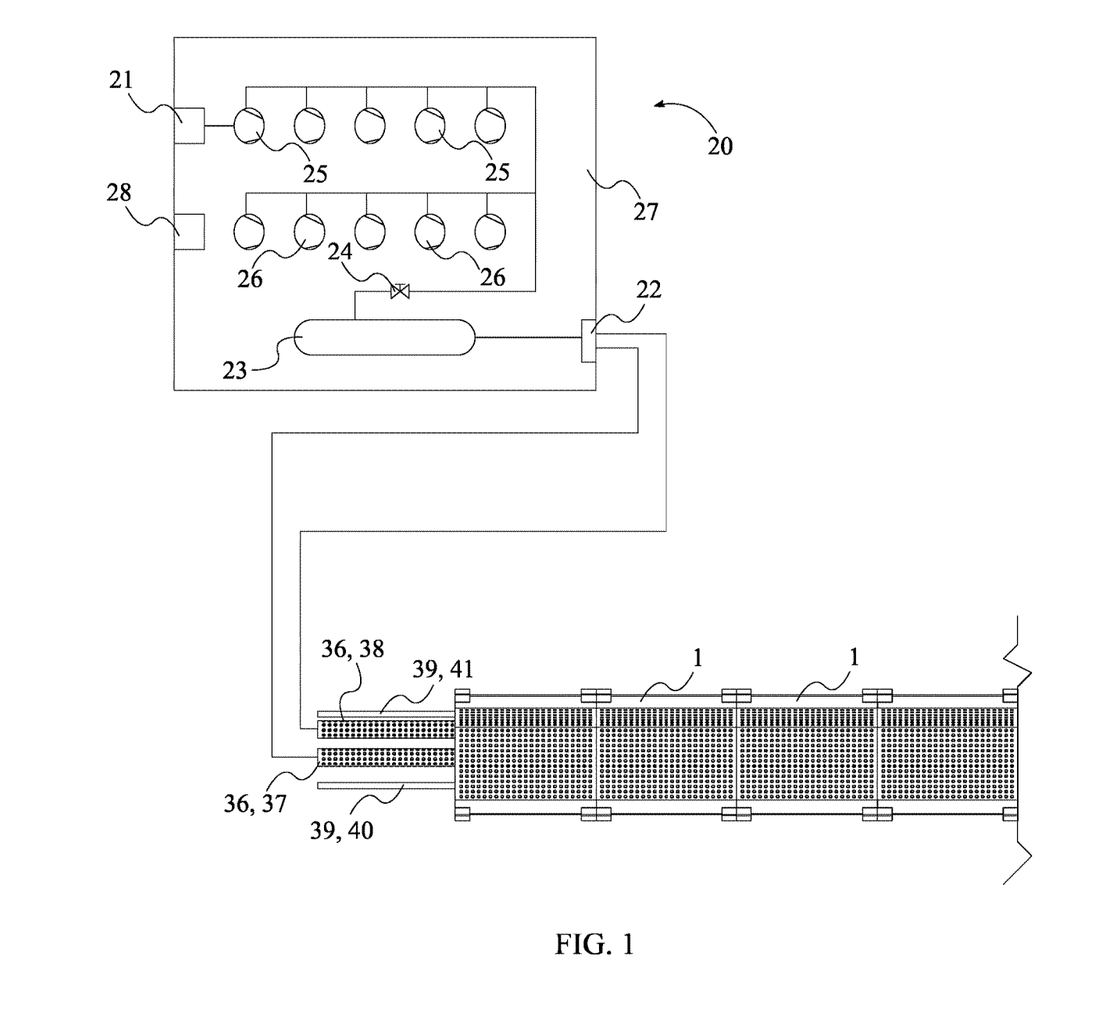
FIG. 1 is a schematic view showing the fluid communication between the air supply system and the plurality of air dispersal units, wherein the plurality of air dispersal units is shown serially coupled to each other.
Figure 2:
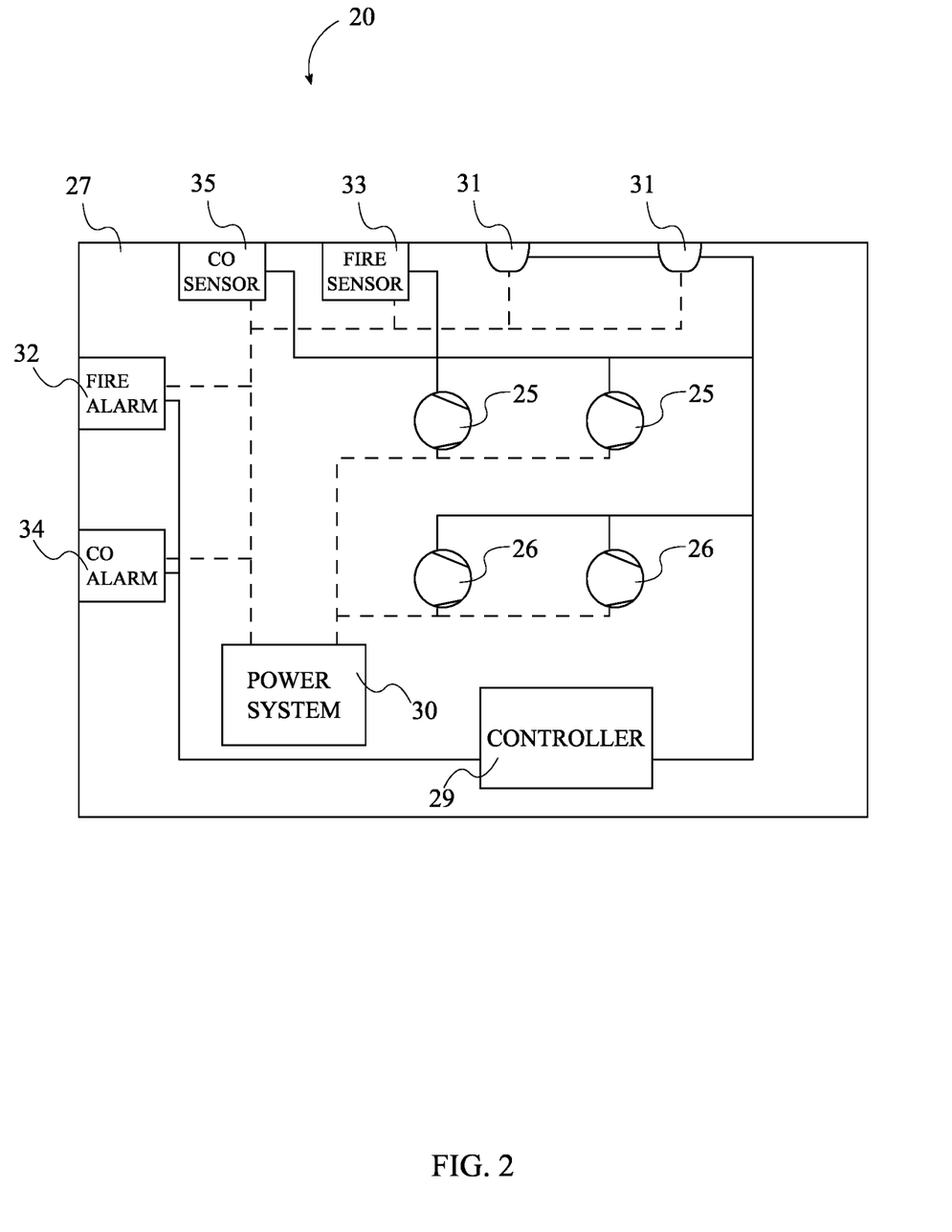
FIG. 2 is a schematic view showing the electronic connections and the electrical connections of the present invention, wherein the electronic connections are shown as solid path lines, and wherein the electrical connections are shown as dashed path lines.

To secure the plurality of air dispersal units 1 to the watercraft's hull, the first base anchor 18 and the second base anchor 19 are designed so that the crew can easily deploy and fasten the chain structure about the wetted hull. As can be seen in FIG. 8 through 10, the first base anchor 18 and the second base anchor 19 are positioned offset from each other at opposing points on the watercraft's port and starboard main decks. Alternatively, the first base anchor 18 and the second base anchor 19 can also be positioned on the exterior hull, above the waterline. The plurality of air dispersal units 1 is mounted in between the first base anchor 18 and the second base anchor 19 so that the plurality of air dispersal units 1 is suspended from the first base anchor 18 and the second base anchor 19. As can be seen in FIGS. 1 and 2, the air supply system 20 is in fluid communication with the plurality of air dispersal units 1 to provide the necessary pressurized air flow that is dispersed by each of the plurality of air dispersal units 1 to form the air layer in between the watercraft's hull and the surrounding water. To control the operation of the system, the controller 29 is electronically connected with the air supply system 20 to regulate the operation of the air supply system 20. The power system 30 is also electrically connected to the controller 29 and the air supply system 20 to provide the power necessary for the constant and efficient operation of the system. The power system 30 is preferably able to provide 115 Volts (V), 220 V, and/or 440 V. The power system 30 can be part of the watercraft's electrical distribution system or be a separate system.

As previously discussed, the air supply system 20 is designed to provide a constant air flow to the plurality of air dispersal units 1 to form an effective air layer to achieve laminar flow about most of the watercraft's wetted hull. To do so, the air supply system 20 may comprise at least one air inlet 21, at least one air outlet 22, at least one air tank 23, at least one supply valve 24, and a plurality of primary compressors 25. As can be seen in FIGS. 1 and 2, the at least one air inlet 21 enables the inflow of air into the system to be pressurized by the plurality of primary compressors 25. The at least one air outlet 22 enables the outflow of pressurized air from the at least one air tank 23 to the plurality of air dispersal units 1. The at least one air tank 23 temporarily retains the pressurized air generated by the plurality of primary compressors 25 until the pressurized air is supplied to the plurality of air dispersal units 1. The at least one supply valve 24 enables the control of pressurized air from the plurality of primary compressors 25 to the at least one air tank 23. The plurality of primary compressors 25 is preferably two to 16, oil-free, low-pressure air compressors. Consequently, the at least one air inlet 21, the plurality of primary compressors 25, the at least one supply valve 24, the at least one air tank 23, and the at least one air outlet 22 are in serial fluid communication with each other. This enables the airflow from the at least one air inlet 21, through the plurality of primary compressors 25, through the at least one air tank 23, and out of the at least one air outlet 23. Further, the at least one air outlet 22 is in fluid communication with the plurality of air dispersal units 1 so that the pressurized air generated by the plurality of primary compressors 25 and temporarily retained by the at least one air tank 23 is then able to flow to each of the plurality of air dispersal units 1.

In some embodiments, the air supply system 20 may utilize a plurality of secondary compressors 26 in case any of the plurality of primary compressors 25 fail or cannot generate the necessary airflow pressure. As can be seen in FIGS. 1 and 2, the plurality of secondary compressors 26 is in parallel fluid communication with the plurality of primary compressors 25. Thus, the plurality of primary compressors 25 and the plurality of secondary compressors 26 can generate the necessary amount of pressurized air for the efficient operation of the system, either individually or simultaneously. In alternate embodiments, other components or additional sets of compressors can be utilized as a redundant safety measure to ensure the continuous operation of the system.

The air supply system 20 can be provided as a separate unit that can be attached to any location in the watercraft near to the plurality of air dispersal units 1. The air supply system 20 is preferably mounted in areas with little to no impact upon the cargo-carrying capacity or cargo-handling operations of the watercraft. As can be seen in FIGS. 1 and 2, the air supply system 20 may further comprise a housing 27 and at least one air vent 28. The housing 27 contains the rest of the components of the air supply system 20. The at least one air vent 28 enables air flow through the housing. The at least one air inlet 21, the at least one air outlet 22, and the at least one air vent 28 are laterally integrated into the housing 27 so that each of those components is accessible from the exterior of the housing 27. The at least one air tank 23, the at least one supply valve 24, the plurality of primary compressors 25, the plurality of secondary compressors 26, the controller 29, and the power system 30 are mounted within the housing 27 so that each of those components is protected from any potential physical damage by the surrounding environment.

In order to protect the air supply system 20 as well as to prevent damage to the surroundings of the air supply system 20 or to the crew, the present invention may further comprise a fire suppression system 31, at least one fire alarm 32, and at least one fire sensor 33. As can be seen in FIG. 2, the fire suppression system 31, the at least one fire alarm 32, and the at least one fire sensor 33 are designed to detect and suppress any fires that may originate inside the housing 27 or the surrounding areas of the housing 27. The at least one fire sensor 33 and the fire suppression system 31 are in thermal communication with the air supply system 20 so that any fire is detected by the at least one fire sensor 33 and contained by the fire suppression system 31. The controller 29 is electronically connected to the fire suppression system 31, the at least one fire alarm 32, and the at least one fire sensor 33. This allows for the signals generated by the at least one fire sensor 33 to be processed by the controller 29 to trigger the at least one fire alarm 32 and activate the first suppression system 31. Moreover, the power system 30 is electrically connected to the at least one fire alarm 32, the at least one fire sensor 33, and the fire suppression system 31 to provide the voltage necessary for the operation of each component.

In addition to protecting the air supply system 20 from fires, the present invention may further comprise at least one carbon monoxide (CO) alarm 34 and at least one CO sensor 35 to protect the crew and surroundings from CO emissions that may originate from the system. As can be seen in FIG. 2, the at least one CO sensor 35 is in pneumatic communication the air supply system 20 to constantly monitor CO levels in the system. The controller 29 is electronically connected to the at least one CO alarm 34 and the at least one CO sensor 35 to process the signals generated from the at least one CO sensor 35 and to trigger the at least one CO alarm 34. Further, the power system 30 is electrically connected to the at least one CO alarm 34 and the at least one CO sensor 35 to provide the voltage necessary for the operation of each component. Some embodiments of the present invention may comprise a control panel on the housing 27 that includes various control means to configure and operate the system. For example, the control panel can provide a start/stop trigger as well as a user interface where the user can select the operating mode for the plurality of primary compressors 25 and the plurality of secondary compressors 26. Preferably, no more than half of the compressors operate at any given time, thereby ensuring full redundancy on a per unit basis. Further, multiple air supply systems can be installed on the watercraft depending on the associated air generation requirements for the watercraft. The modes of operation of the multiple compressors preferably include an "At-Sea" mode, an "In-Port" mode, and a "Secured" mode. The "At-Sea" mode provides a steady flow of low amount of pressurized air ranging from 30 to 120 pounds per square inch (psi). The "In-Port" mode sustains a minimal amount of pressurized air (five to 55 psi) throughout the system to limit the marine growth on the system's waterborne components as well as on the watercraft's hull. The "Secured" mode eliminates all air supply to the system and is reserved only for periods in which the watercraft is dry-docked or undergoing system maintenance. In other embodiments, other safety measures can be included in the system to protect the components, the crew, and the surroundings.

Figure 3:
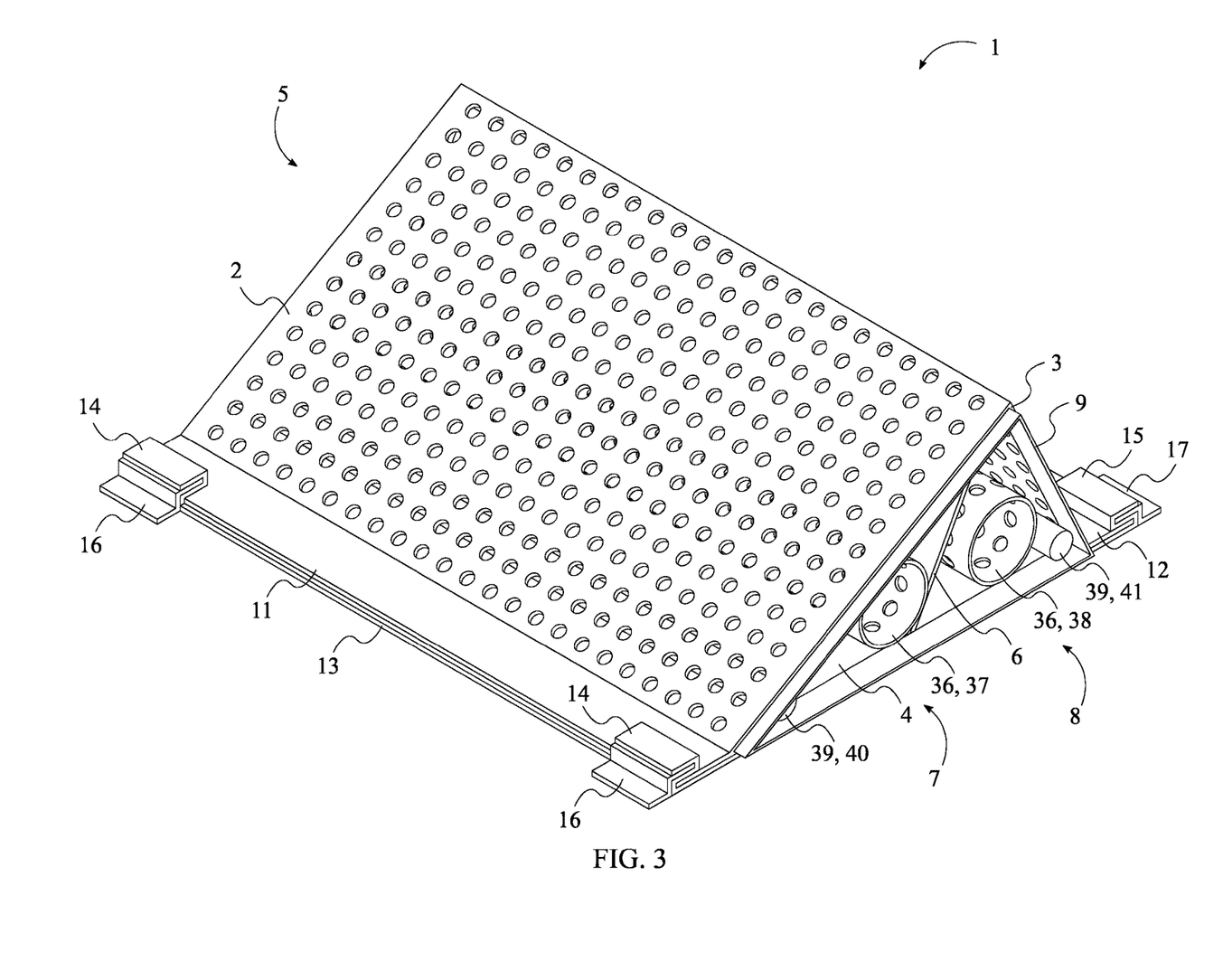
FIG. 3 is a top front perspective view showing an air dispersal unit of the plurality of air dispersal units of the present invention.
Figure 4:
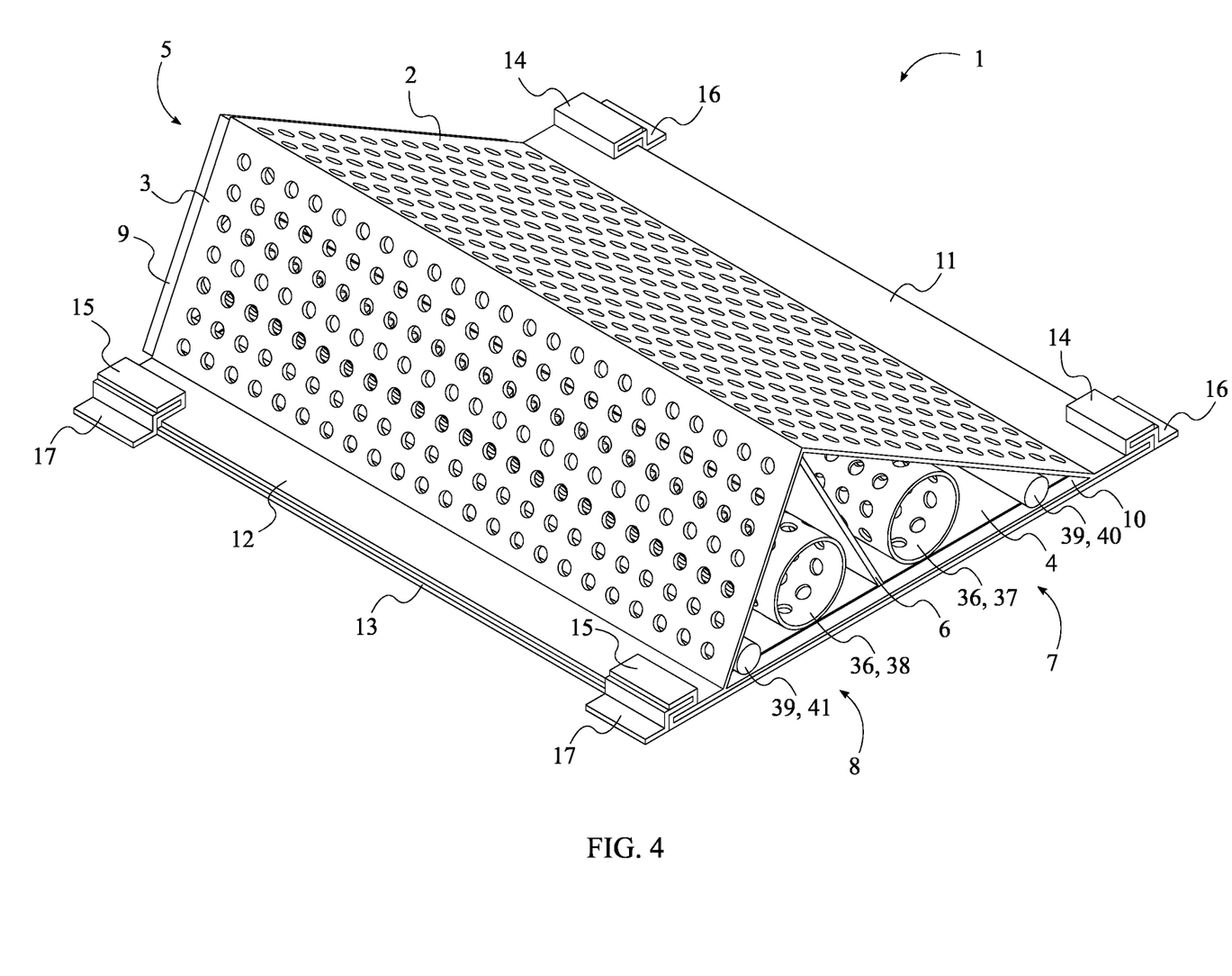
FIG. 4 is a top rear perspective view showing an air dispersal unit of the plurality of air dispersal units of the present invention.
Figure 5:
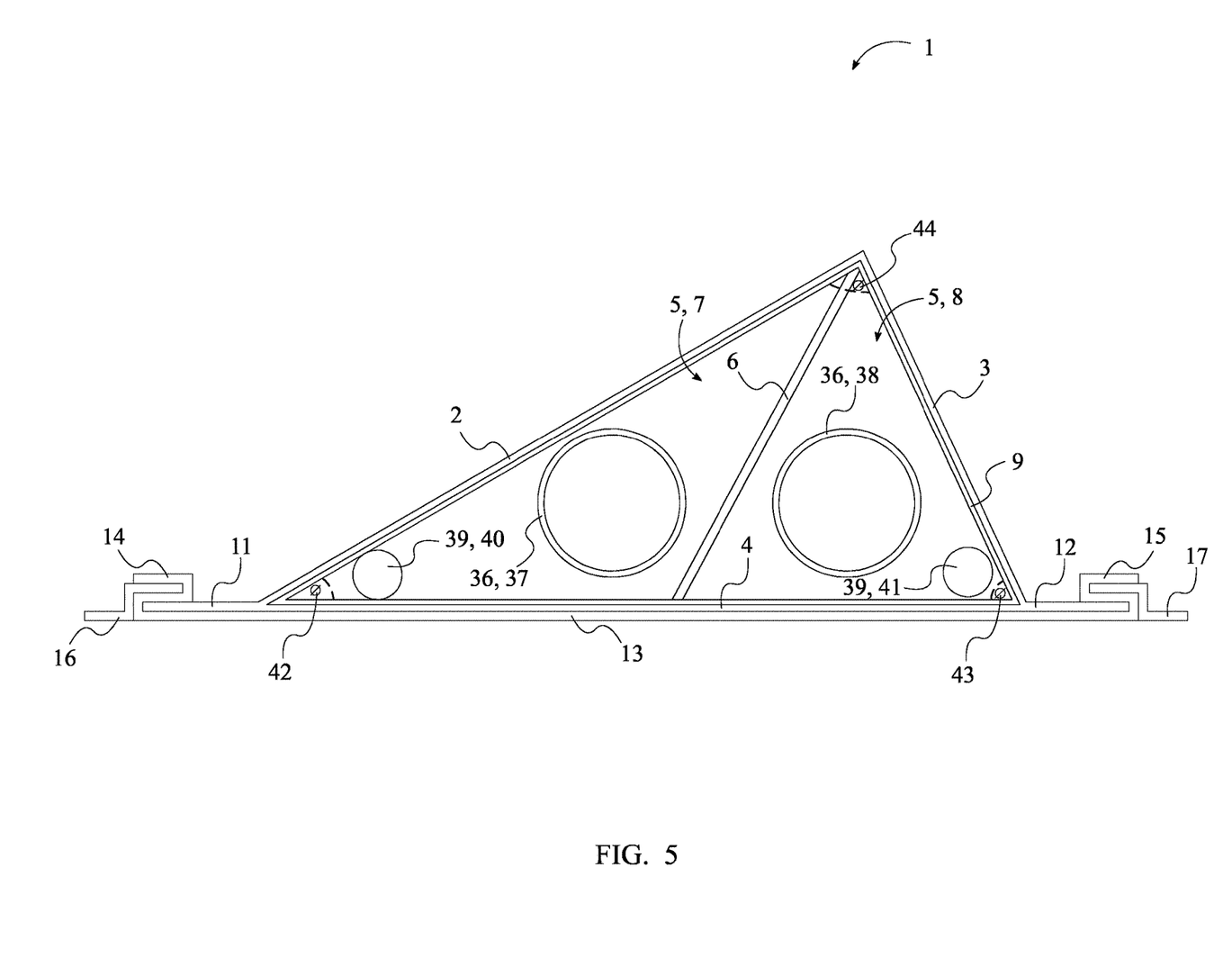
FIG. 5 is a side view showing an air dispersal unit of the plurality of air dispersal units of the present invention.

The present invention ensures proper support and pressurized air is distributed to each of the of the plurality of air dispersal units 1. As can be seen in FIG. 3 through 5, the present invention may further comprise at least one perforated tube 36 and at least one support cable 39. The at least one perforated tube 36 ensures each plurality of air dispersal units 1 receives enough pressurized airflow and the at least one support cable 39 maintains the plurality of air dispersal units 1 secured to the watercraft's hull. In addition, each of the plurality of air dispersal units 1 comprises a first perforated panel 2, a second perforated panel 3, and a base panel 4. The first perforated panel 2 and the second perforated panel 3 enable the dispersal of the pressurized airflow. The base panel 4 serves as the interface between each of the plurality of air dispersal units 1 and the watercraft's hull. The base panel 4 is preferably a rectangular-shaped panel with a thickness of half an inch to two inches. The at least one perforated tube 36 is preferably a braided perforated tube made of rubber with internal metal bands. The at least one support cable 39 is preferably a wire rope with a diameter ranging from 0.25 in. to 0.50 in. The wire rope is also covered by a sleeve with a diameter ranging from 0.375 in. to 0.625 in. The sleeve prevents the deterioration of the wire rope and reduces friction between the wire rope, the interior of the triangular tube 5, and the watercraft's hull. The first perforated panel 2, the second perforated panel 3, and the base panel 4 are arranged into a triangular tube 5, preferably a scalene triangular-shaped tube. This positions the first perforated panel 2 and the second perforated panel 3 adjacent to each other about the triangular tube 5 to disperse the pressurized airflow into two different directions. Moreover, the air supply system 20 is in fluid communication with the at least one perforated tube 36 to distribute the pressurized airflow to the plurality of air dispersal units 1. The at least one support cable 39 is tethered in between the first base anchor 18 and the second base anchor 19 to support the plurality of air dispersal units 1. Further, the at least one perforated tube 36 and the at least one support cable 39 is positioned through the triangular tube 5 for each of the plurality of air dispersal units 1. Thus, each of the plurality of air dispersal units 1 is secured against the watercraft's hull so that the plurality of air dispersal units 1 cannot be disloged from the watercraft's hull.

As can be seen in FIG. 5, the triangular tube 5 of each of the plurality of air dispersal units 1 is preferably divided into multiple chambers to facilitate the dispersal of the pressurized airflow into the desired directions. Each of the plurality of air dispersal units 1 may further comprise a division panel 6 that preferably partitions the corresponding triangular tube 5 into two chambers. Thus, the triangular tube 5 is internally bifurcated into a first chamber 7 and a second chamber 8 by the division panel 6. The first chamber 7 is enclosed by the first perforated panel 2, the division panel 6, and the base panel 4, while the second chamber 8 is enclosed by the second perforated panel 3, the division panel 6, and the base panel 4. Moreover, due to the triangular tube 5 being internally bifurcated, the at least one perforated tube 36 is a first perforated tube 37 and a second perforated tube 38. The first perforated tube 37 and the second perforated tube 38 distribute pressurized airflow to the first chamber 7 and the second chamber 8, respectively. Thus, the first perforated tube 37 is positioned through the first chamber 7 for each of the plurality of air dispersal units 1, while the second perforated tube 38 is positioned through the second chamber 8 for each of the plurality of air dispersal units 1. Like the at least one perforated tube 36, the at least one support cable 39 is a first support cable 40 and a second support cable 41 designed to accommodate the bifurcated triangular tube 5. The first support cable 40 is positioned through the first chamber 7 for each of the plurality of air dispersal units 1, while the second support cable 41 is positioned through the second chamber 8 for each of the plurality of air dispersal units 1. Thus, the first support cable 40 and the second support cable 41 work in conjunction to further press each of the plurality of air dispersal units 1 against the watercraft's hull, which prevents the plurality of air dispersal units 1 from being dislodged as the watercraft moves through the body of water.

As previously discussed, each of the plurality of air dispersal units 1 is designed to disperse the pressurized airflow in a predetermined direction. So, each triangular tube 5 is constructed with a specific scalene design, as can be seen in FIG. 5. A first angle 42 between the first perforated panel 2 and the base panel 4 is 30 degrees. A second angle 43 between the second perforated panel 3 and the base panel 4 is 65 degrees. Further, a third angle 44 between the first perforated panel 2 and the second perforated panel 3 is 85 degrees. Thus, the base panel 4 has a length greater than the first perforated panel 2, and the first perforated panel 2 has a length greater than the second perforated panel 3. In other embodiments, the triangular tube 5 for each of the plurality of air dispersal units 1 may have different scalene designs.

Figure 6:
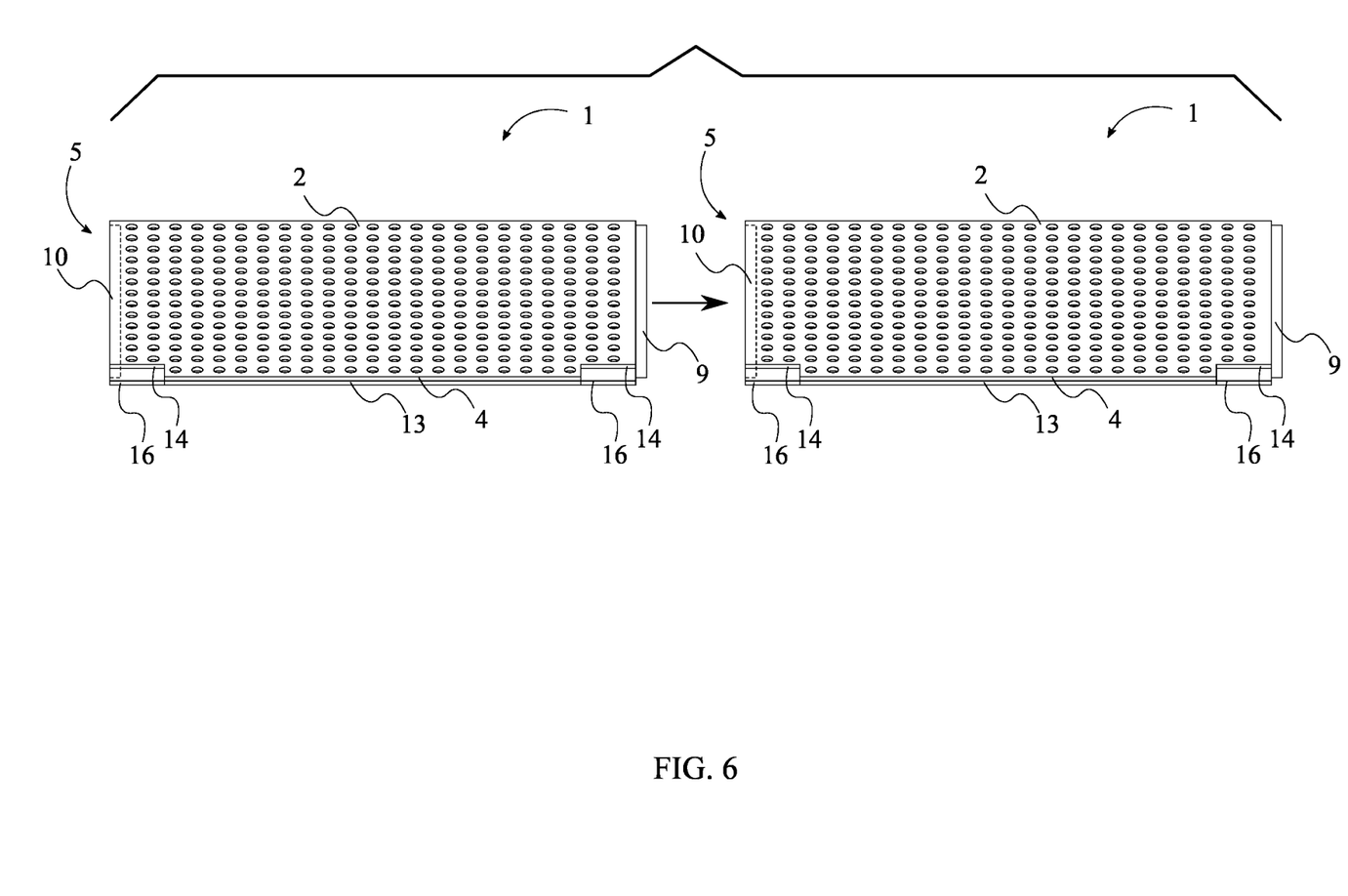
FIG. 6 is a front view showing an arbitrary air dispersal unit and a subsequent air dispersal unit from the plurality of air dispersal units being coupled to each other.
Figure 7:
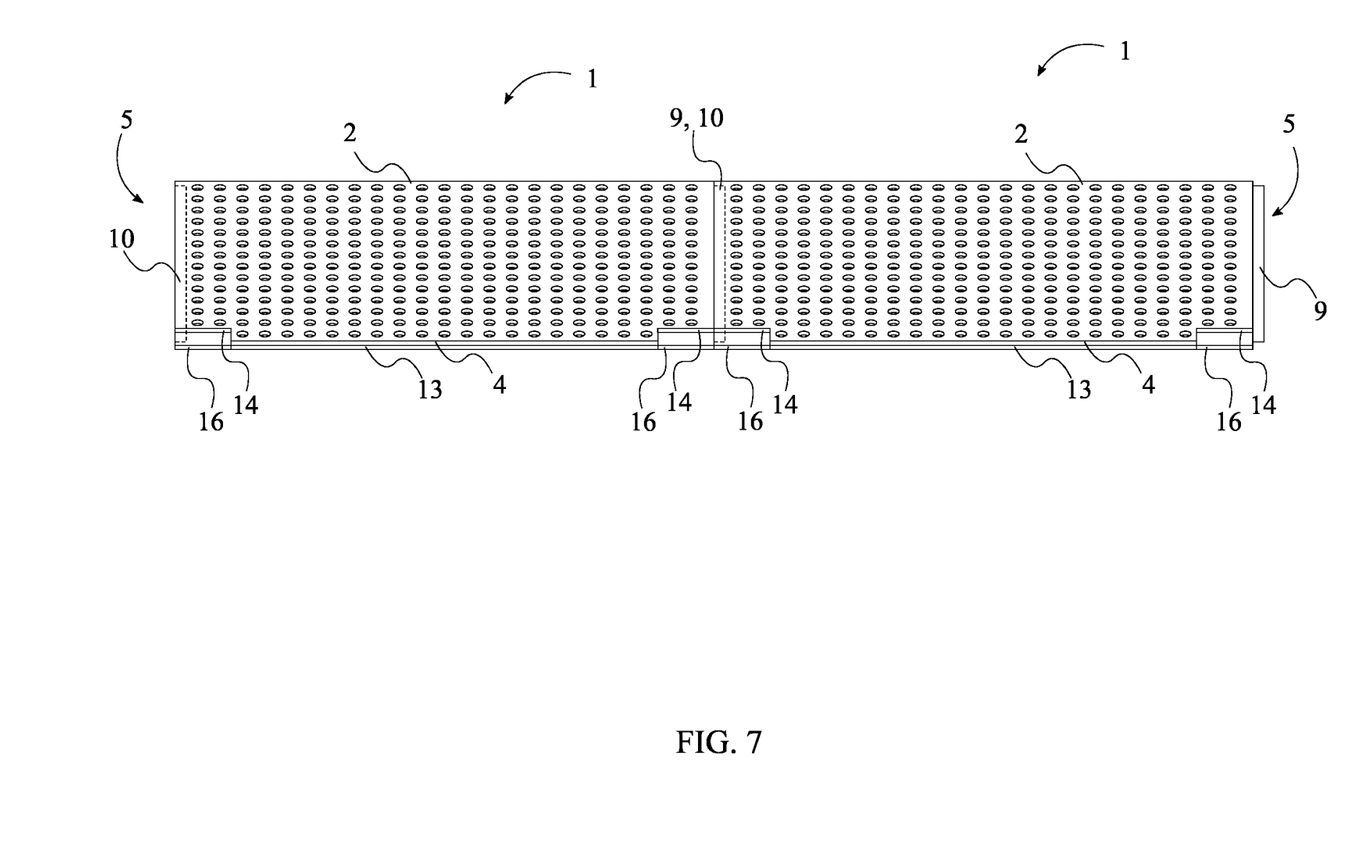
FIG. 7 is a front view showing the arbitrary air dispersal unit and the subsequent air dispersal unit from the plurality of air dispersal units shown in FIG. 6 coupled to each other.

To facilitate the coupling of the plurality of air dispersal units 1 to each other, each of the plurality of air dispersal units 1 may further comprise a first interlocking feature 9 and a second interlocking feature 10. As can be seen in FIGS. 6 and 7, the first interlocking feature 9 and the second interlocking feature 10 ensures that the plurality of air dispersal units remain coupled to each other as the watercraft moves through the body of water. The first interlocking feature 9 is preferably an interlocking flange made of hard rubber with 0.5 inch to 1.5 inches overlap to interlock with the second interlocking feature 10. The second interlocking feature 10 is preferably a lip designed to receive the first interlocking feature 9. The first interlocking feature 9 is terminally integrated into the triangular tube 5, while the second interlocking feature 10 is terminally integrated into the triangular tube 5, opposite to the first interlocking feature 9. Thus, to couple two air dispensing units, the first interlocking feature 9 of an arbitrary unit is hermetically engaged to the second interlocking feature 10 of a subsequent unit, wherein the arbitrary unit and the subsequent unit are adjacent units from the plurality of air dispersal units 1. Several gaskets made of non-permeable rubber can be positioned in between the first interlocking feature 9 and the second interlocking feature 10 to eliminate water intrusion into the system. The process is repeated until the desired length of the chain structure is constructed.

Further, to increase the sound mitigation of the system, each of the plurality of air dispersal units 1 may further comprise a first panel extrusion 11, a second panel extrusion 12, and a dampening gasket 13. As can be seen in FIG. 3 through 5, the dampening gasket 13 serves as a rattle buffer between the triangular tube 5 and the watercraft's hull. The dampening gasket 13 also eliminates any potential dissimilar metal corrosion. The first panel extrusion 11 and the second panel extrusion 12 extend the width of the base panel 4, preferably one to three inches, on both sides of the base panel 4. The first panel extrusion 11 is connected coplanar and adjacent to the base panel 4. Similarly, the second panel extrusion 12 is connected coplanar and adjacent to the base panel 4, opposite to the first panel extrusion 11. Moreover, the dampening gasket 13 is hermetically connected across the first panel extrusion 11, the base panel 4, and the second panel extrusion 12, opposite to the first perforated panel 2 and the second perforated panel 3. Thus, the dampening gasket 13 can cover the entirety of the base panel 4 to greatly reduce any possible rattle.

To secure the dampening gasket 13 to the base panel 4, each of the plurality of air dispersal units 1 may further comprise a first pair of gasket tabs 14, a second pair of gasket tabs 15, a first pair of brackets 16, and a second pair of brackets 17. As can be seen in FIG. 3 through 5, the first pair of gasket tabs 14 and the second pair of gasket tabs 15 enable the dampening gasket 13 to be secured to the base panel 4 using the first pair of brackets 16 and the second pair of brackets 17. The first pair of brackets 16 and the second pair of brackets 17 are preferably Z-shaped brackets made of sheet steel. Each of the first pair of brackets 16 and each of the second pair of brackets 17 are preferably two to six inches in length with three inches of the bracket attached to the hull. The dampening gasket 13 is also preferably made of salt water-resistant rubber designed to reduce vibration sounds between the watercraft's hull and the multiple brackets. The first pair of gasket tabs 14 is positioned offset from each other, preferably two feet apart. The first pair of gasket tabs 14 is also connected adjacent to the dampening gasket 13. The positioning of the first pair of gasket tabs 14 enables the dampening gasket 13 to be tightly secured along the first panel extrusion 11. Finally, each of the first pair of gasket tabs 14 is pressed against the first panel extrusion 11 by a corresponding bracket from the first pair of brackets 16. Likewise, the second pair of gasket tabs 15 is positioned offset from each other. The second pair of gasket tabs 15 is also connected adjacent to the dampening gasket 13, opposite to the first pair of gasket tabs 14. The positioning of the second pair of gasket tabs 15 enables the dampening gasket 13 to also be tightly secured along the second panel extrusion 12. Finally, each of the second pair of gasket tabs 15 is pressed against the second panel extrusion 12 by a corresponding bracket from the second pair of brackets 17. In other embodiments, other types of fastening means can be used to secure the dampening gasket 13 to the base panel 4.

As previously discussed, the first base anchor 18 and the second base anchor 19 are preferably located at opposing points on the watercraft's port and starboard main deck or exterior hull (above the waterline). As can be seen in FIG. 8, the first support cable 40 and the second support cable 41 are tethered in between the first base anchor 18 and the second base anchor 19. To facilitate the fastening of the first support cable 40 and the second support cable 41 to both the first base anchor 18 and the second base anchor 19, the present invention may further comprise at least one closed roller chock and a plurality of threading eyelets. The closed roller chock helps to secure the first support cable 40 and the second support cable 41 against the deck. The plurality of threading eyelets can be distributed across the watercraft's freeboard and help tension the first support cable 40 and the second support cable 41. To fasten the plurality of air dispersal units 1 to the watercraft's hull, the first support cable 40 and the second support cable 41 traverse through each of the plurality of air dispersal units 1, reemerge on the opposing sides of the watercraft, extend through the plurality of threading eyelets, pass through the at least one closed roller chock, and ultimately terminate on the first base anchor 18 and the second base anchor 19. Further, the first support cable 40 and the second support cable 41 are oriented at nearly perpendicular angles along the watercraft's wetted hull.

Although the invention has been explained in relation to its preferred embodiment, it is to be understood that many other possible modifications and variations can be made without departing from the spirit and scope of the invention.

What is claimed is:

1. A transverse hydro-laminar flow system comprising:
a plurality of air dispersal units,
each of the plurality of air dispersal units comprising a first perforated panel, a second perforated panel, and a base panel, and
the first perforated panel, the second perforated panel, and the base panel of each air dispersal unit being arranged into a triangular tube;
a first base anchor;
a second base anchor;
an air supply system;
a controller;
a power system;
at least one perforated tube;
the plurality of air dispersal units being serially coupled to each other;
the first base anchor and the second base anchor being positioned offset from each other;
at least one support cable,
the at least one perforated tube and the at least one support cable being positioned through the triangular tube for each of the plurality of air dispersal units, and
the at least one support cable being tethered in between the first base anchor and the second base anchor;
the plurality of air dispersal units being mounted in between the first base anchor and the second base anchor;
the air supply system being in fluid communication with the plurality of air dispersal units and with the at least one perforated tube;
the controller being electronically connected with the air supply system; and,
the power system being electrically connected to the controller and the air supply system.

2. The transverse hydro-laminar flow system as claimed in claim 1 comprising:
the air supply system comprising at least one air inlet, at least one air outlet, at least one air tank, at least one supply valve, and a plurality of primary compressors;
the at least one air inlet, the plurality of primary compressors, the at least one supply valve, the at least one air tank, and the at least one air outlet being in serial fluid communication with each other; and,
the at least one air outlet being in fluid communication with the plurality of air dispersal units.

3. The transverse hydro-laminar flow system as claimed in claim 2 comprising:
the air supply system further comprising a plurality of secondary compressors; and,
the plurality of secondary compressors being in parallel fluid communication with the plurality of primary compressors.

4. The transverse hydro-laminar flow system as claimed in claim 2 comprising:
the air supply system further comprising a housing and at least one air vent;
the at least one air inlet, the at least one air outlet, and the at least one air vent being laterally integrated into the housing; and,
the at least one air tank, the at least one supply valve, the plurality of primary compressors, the controller, and the power system being mounted within the housing.

5. The transverse hydro-laminar flow system as claimed in claim 1 comprising:
a fire suppression system;
at least one fire alarm;
at least one fire sensor;
the at least one fire sensor and the fire suppression system being in thermal communication with the air supply system;
the controller being electronically connected to the fire suppression system, the at least one fire alarm, and the at least one fire sensor; and,
the power system being electrically connected to the at least one fire alarm, the at least one fire sensor, and the fire suppression system.

6. The transverse hydro-laminar flow system as claimed in claim 1 comprising:
at least one carbon monoxide (CO) alarm;
at least one CO sensor;
the at least one CO sensor being in pneumatic communication the air supply system;
the controller being electronically connected to the at least one CO alarm and the at least one CO sensor; and,
the power system being electrically connected to the at least one CO alarm and the at least one CO sensor.

7. The transverse hydro-laminar flow system as claimed in claim 1 comprising:
each of the plurality of air dispersal units further comprising a division panel;
the triangular tube being internally bifurcated into a first chamber and a second chamber by the division panel;
the first chamber being enclosed by the first perforated panel, the division panel, and the base panel; and,
the second chamber being enclosed by the second perforated panel, the division panel, and the base panel.

8. The transverse hydro-laminar flow system as claimed in claim 7 comprising:
the at least one perforated tube being a first perforated tube and a second perforated tube;
the first perforated tube being positioned through the first chamber for each of the plurality of air dispersal units; and,
the second perforated tube being positioned through the second chamber for each of the plurality of air dispersal units.

9. The transverse hydro-laminar flow system as claimed in claim 7 comprising:
the at least one support cable being a first support cable and a second support cable;
the first support cable being positioned through the first chamber for each of the plurality of air dispersal units; and, the second support cable being positioned through the second chamber for each of the plurality of air dispersal units.

10. The transverse hydro-laminar flow system as claimed in claim 1 comprising:

a first angle between the first perforated panel and the base panel being 30 degrees;

a second angle between the second perforated panel and the base panel being 65 degrees; and, a third angle between the first perforated panel and the second perforated panel being 85 degrees.

11. The transverse hydro-laminar flow system as claimed in claim 1 comprising:

each of the plurality of air dispersal units further comprising a first interlocking feature and a second interlocking feature;

the first interlocking feature being terminally integrated into the triangular tube;

the second interlocking feature being terminally integrated into the triangular tube, opposite to the first interlocking feature; and, the first interlocking feature of an arbitrary unit being hermetically engaged to the second interlocking feature of a subsequent unit, wherein the arbitrary unit and the subsequent unit are adjacent units from the plurality of air dispersal units.

12. The transverse hydro-laminar flow system as claimed in claim 1 comprising:

each of the plurality of air dispersal units further comprising a first panel extrusion, a second panel extrusion, and a dampening gasket;

the first panel extrusion being connected coplanar and adjacent to the base panel;

the second panel extrusion being connected coplanar and adjacent to the base panel, opposite to the first panel extrusion; and, the dampening gasket being hermetically connected across the first panel extrusion, the base panel, and the second panel extrusion, opposite to the first perforated panel and the second perforated panel.

13. The transverse hydro-laminar flow system as claimed in claim 12 comprising:

each of the plurality of air dispersal units further comprising a first pair of gasket tabs, a second pair of gasket tabs, a first pair of brackets, and a second pair of brackets;

the first pair of gasket tabs being positioned offset from each other;

the first pair of gasket tabs being connected adjacent to the dampening gasket;

each of the first pair of gasket tabs being pressed against the first panel extrusion by a corresponding bracket from the first pair of brackets;

the second pair of gasket tabs being positioned offset from each other;

the second pair of gasket tabs being connected adjacent to the dampening gasket, opposite to the first pair of gasket tabs; and, each of the second pair of gasket tabs being pressed against the second panel extrusion by a corresponding bracket from the second pair of brackets.

* * * * *